United States Patent [19]

Jung

[11] 4,437,936
[45] Mar. 20, 1984

[54] PROCESS FOR UTILIZING WASTE HEAT AND FOR OBTAINING WATER GAS DURING THE COOLING OF INCANDESCENT COKE

[75] Inventor: Richard A. Jung, Gummersbach, Fed. Rep. of Germany

[73] Assignee: Hartung, Kuhn & Co. Maschinenfabrik GmbH, Dusseldorf, Fed. Rep. of Germany

[21] Appl. No.: 361,053

[22] Filed: Mar. 23, 1982

[30] Foreign Application Priority Data

Mar. 27, 1981 [DE] Fed. Rep. of Germany ....... 3112256

[51] Int. Cl.³ .................. C10B 27/00; C10B 39/02; C10B 39/04
[52] U.S. Cl. ......................................... 201/39; 201/41; 202/227; 202/228
[58] Field of Search ................ 201/39, 41; 202/227, 202/228

[56] References Cited

U.S. PATENT DOCUMENTS

| | | | |
|---|---|---|---|
| 3,988,211 | 10/1976 | Lewandowski et al. | 202/228 |
| 4,066,513 | 1/1978 | Jablin | 202/227 |
| 4,100,034 | 7/1978 | Smith et al. | 201/39 |
| 4,211,607 | 7/1980 | Privalov et al. | 201/39 |
| 4,288,294 | 9/1981 | Velling | 202/228 |

FOREIGN PATENT DOCUMENTS

| | | | |
|---|---|---|---|
| 3000808 | 7/1981 | Fed. Rep. of Germany | 202/228 |
| 53-71102 | 6/1978 | Japan | 201/39 |

Primary Examiner—Bradley Garris
Attorney, Agent, or Firm—Dressler, Goldsmith, Shore, Sutker & Milnamow, Ltd.

[57] ABSTRACT

A process for utilizing waste heat and for obtaining water gas during the cooling of incandescent coke ejected from a chamber oven is described, this process being in two stages. In the first stage, the coke is dry-cooled with a mixture of water gas and water vapor as the cooling gas. This is circulated, and from the circuit the desired waste heat and the desired water gas are extracted. In the second stage, the coke is wet-cooled with water. The water vapor formed is taken off and returned to the environment and/or to the second stage.

An apparatus is described for carrying out the process, and this apparatus has, located under one another, a filling shaft (1), a pre-chamber (2), a cooling chamber (3), a quenching chamber (4) with a water-spray device (5), an extraction housing (6) and a discharge shaft (7), and is equipped with a cooling-gas discharge line (19) leading away from the cooling chamber (3) and, in succession, a coarse separator (20), a heat sink (21), a blower (23), a cooling-gas delivery line (25) to the cooling chamber (3), an extraction line (26) leading away from the cooling-gas delivery line (25) with a throttling device (27), and a take-off line (34) which leads away from the extraction housing (6) and which leads to a cyclone separator (35), a blower (36) and an exhaust steam pipe (38) with a throttling device (37) and/or to a return line (39) with a throttling device (40).

7 Claims, 1 Drawing Figure

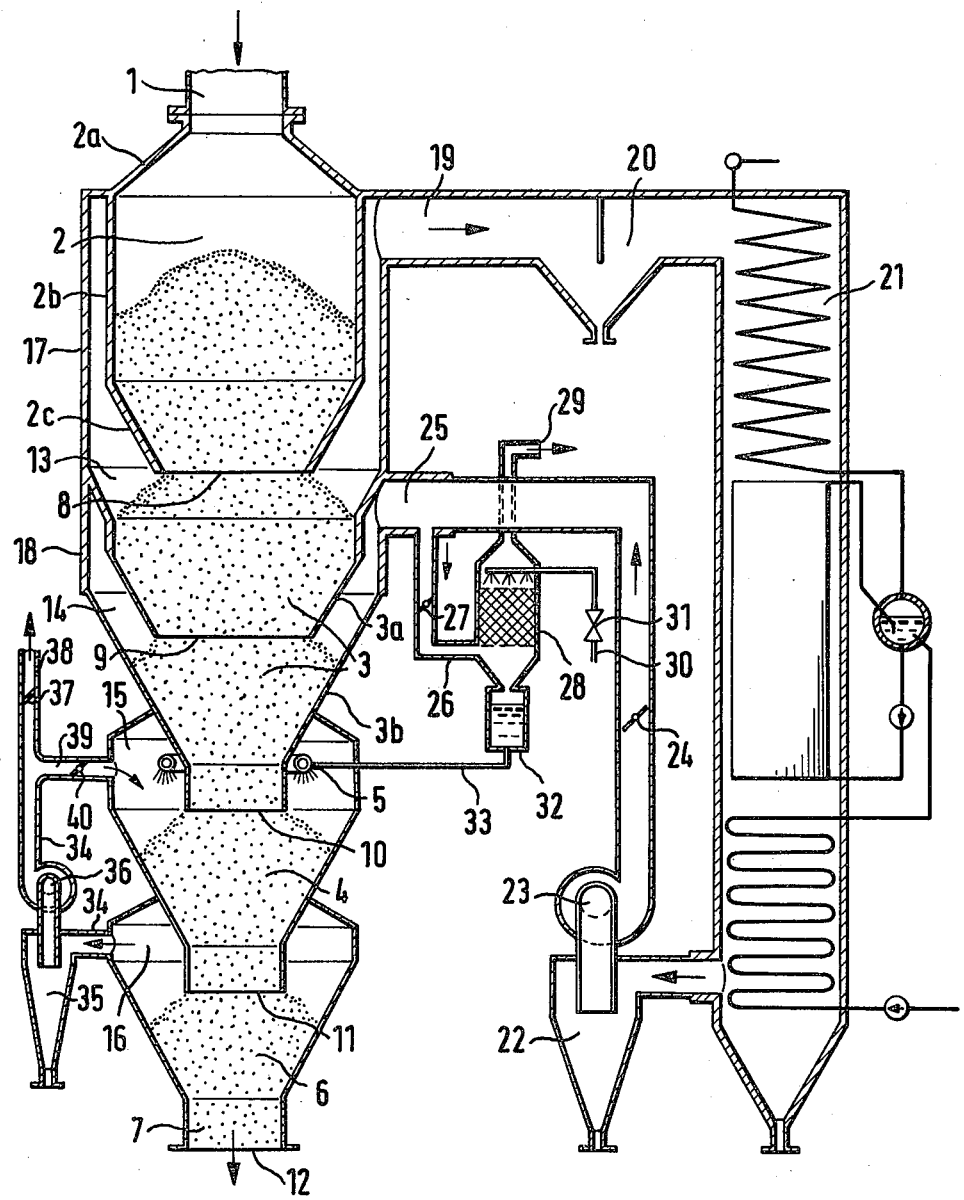

PROCESS FOR UTILIZING WASTE HEAT AND FOR OBTAINING WATER GAS DURING THE COOLING OF INCANDESCENT COKE

An apparatus for the dry cooling of coke is known from German Offenlegungsschrift No. 2,455,496, and this consists of a vertical vessel with an upper coke feed and discharge of the cooled coke at the lower end, the delivery line of a circulated cooling gas being provided in the lower region of the vessel and the discharge line of this cooling gas being provided in the upper region. Adjoining the cooling vessel towards the bottom is a coke discharge shaft through which a part quantity of the fed cooling gas flows downwards and the lower end of which is connected to the cooling-gas circuit via a return line for the part quantity of cooling gas. The return line is connected either to the delivery line of the cooling gas to the vessel or the discharge line of the cooling gas from the vessel. The branching of the re-cooled and compressed stream of cooling gas into a part stream flowing upwards through the coke bed in the cooling vessel and into a part stream flowing downwards in the discharge shaft permits an operation which simplifies the feeding and discharge of the coke and in which the gas pressure both at the head of the vessel and at the discharge end corresponds to the ambient pressure. However, even if this apparatus, just as in all installations with exclusive dry cooling of the coke to a sufficiently low outflow temperature, a large amount of time and also a large amount of space are required for cooling.

A process and an apparatus for cooling coke are indicated in German Offenlegungsschrift No. 2,533,606, and here, in a first cooling stage, the temperature of the coke of approximately 1,100° C. is lowered to approximately 315° to 425° C. by passing inert gas through it and is subsequently lowered further, in a second cooling stage, by spraying with water. An essential feature here is that the water vapor formed in the second cooling stage is prevented from penetrating into the vessel of the first cooling stage and the formation of water gas in this stage is avoided. From the "pressure retention device" provided for this purpose, the coke is introduced by a vibrating feeder onto a chute and is, at the same time, sprayed with water. The channel leads to a wet-quenching bunker with a device for continuously discharging the coke onto an open conveyor. A disadvantage of this process is the considerable outlay in terms of construction which is required to prevent vapor from overflowing into the first cooling stage. Also, the apparatus is not suitable for recovering water gas, the very formation of which is to be prevented.

A process for the dry cooling of carbonized coke by means of insert gases is described in German Patent Specification No. 472,510. In a special alternative form of the process, water or water vapor is added to the cooling gas before the latter enters the coke bed, resulting in the generation of water gas which is consumed before or within a heat-utilizing station by the addition of air. The addition of water is restricted to the quantity which can evaporate in the gas stream up to entry into the coke. Consequently, as regards the emission of heat from the coke to the cooling medium, the process is one of dry cooling with the disadvantage, already mentioned, of a large space requirement which is not significantly reduced here by the endothermic water-gas reaction of the water vapor with the coke.

There are also several known processes in which water vapor is used for cooling incandescent coke and, at the same time, water gas is obtained. However, these processes are inappropriate inasmuch as they allow the production of water gas and the discharge of the cooled coke only intermittently (see German Patent Specification Nos. 413,372, 414,138 and 490,981), or require, in addition to water or steam, further coolant components, such as tar in mist form (see German Patent Specification No. 567,067), or hydrocarbons and additional preheating of the coke to at least 1,200° C. (see German Offenlegungsschrift No. 2,808,804).

The object on which the invention is based is to make available a process and an apparatus for extracting waste heat and water gas during the cooling of incandescent coke ejected from a chamber oven; in particular, the following advantages are intended to be achieved:

1. The waste heat is to be extracted from the coke in the shortest possible time.
2. The waste heat is to be removed from the coke as completely as possible.
3. The waste heat is to be extracted by simple means.
4. The power requirement for circulating the gaseous cooling medium is to be as low as possible.
5. The process is to permit the controllable generation of water gas.
6. During the feeding and discharge of the coke, neither air should penetrate into the cooling circuit from outside nor should cooling medium escape into the environment.
7. The apparatus is to have as small a constructional volume as possible.
8. During the extraction of heat from the coke, as little coke dust as possible should occur.
9. As high-grade coke as possible should be obtained, containing, for example, as little sulfur as possible.

These objects are achieved by means of the invention. The invention thus relates to the subject defined in the claims.

According to the invention, after leaving a dry cooling chamber and before entering a discharge shaft, the coke is mixed with water in a quenching chamber. Of the water vapor arising during this time in the quenching chamber with cooling of the coke, a first part stream is conveyed upwards through the coke bed into the cooling chamber and is partially converted by endothermic reaction with the coke into water gas, which can be removed from the cooling gas circulation after the latter has been scrubbed and cooled in a heat sink. A second part stream is conveyed downwards through the coke bed in the quenching chamber and is then conveyed back into the upper region of the quenching chamber and/or away into the environment via an exhaust steam line.

The objects on which the invention is based are achieved, as follows:

1. During extraction of the waste heat, the cooling time of the coke is short, since its heat is dissipated both by a gaseous cooling medium and by the evaporation of water and also by the endothermic chemical reaction of the formation of water gas, and the elementary hydrogen contained in the cooling gas substantially assists the absorption of heat from the coke. This property also has an advantageous effect on the heat emission of the cooling gas, for example in a waste-heat boiler.
2. Complete cooling of the coke means that no relatively large temperature differences occur within the bed transversely to the direction of flow. Appropriate compensation is achieved by means of the downwardly tapered transitions between the chambers and because a vapor circulation stream, which also assists distribution of the sprayed-in quenching water, is conveyed through the quenching chamber.

3. The extraction of waste heat is very simple because only water needs to be supplied to the system as a cooling medium. There is no need for the external production of water vapor as a cooling medium or for the preparation of an inert gas.

4. In comparison with inert gas having a high content of nitrogen, the more favorable cooling properties of the cooling medium, preferably containing water gas, under comparable conditions and with the same throughput and the same cooling of the coke lead to a reduction in the power requirement for the circulation of cooling gas of at least 50%.

5. The part stream of vapor conveyed upwards out of the quenching chamber through the coke bed into the cooling chamber can be regulated by means of the return stream of vapor to the quenching chamber and by means of the waste-vapor steam into the environment within the limits from zero to the vapor stream generated in the quenching chamber. During this regulation, the rate of gasification of the coke changes from zero to a reaction-kinetic limit which, at a coke temperature at the entrance to the cooling chamber of 1,100° C., and increasing with the vapor stream conveyed over it, can amount to a few %. The generation of water gas relative to the coke throughput is 2.5 times the rate of gasification.

6. Cooling of the coke in two stages, by dry cooling in the cooling chamber and wet cooling in the quenching chamber, permits an operation of the installation in which the pressure both of the gas at the feed end in the pre-chamber and of the vapor in the discharge shaft correspond to the ambient pressure. This pressure compensation prevents the cooling media from flowing outwards or air from the outside atmosphere from penetrating into the cooling chamber or quenching chamber.

7. As a result of the combined application of a gaseous coolant, the evaporation of a liquid and an endothermic chemical reaction, the heat is removed from the coke so quickly that even a small constructional volume is sufficient for an economical mode of operation of the apparatus according to the invention.

8. Dry cooling of the coke by counterflow and wet cooling in a low range of the coke temperature prevent abrupt cooling of the coke and therefore also decrepitation of the pieces of coke as a result of thermal stresses. Consequently, dust formation during cooling is reduced to the abrasion within the coke bed and on the chamber walls. Discharge of the dust together with the vapor extracted at the inflow of the discharge shaft can be reduced by partially binding the dust with non-evaporating excess water.

9. The cooling gas contains a relatively large amount of hydrogen. This reacts at least partially with the sulfur in the coke and thus lowers its sulfur content.

The process according to the invention is explained below with reference to the drawing of an exemplary embodiment of an apparatus for putting this process into practice.

The apparatus comprises, located under one another, a filling shaft 1, a closable pre-chamber 2, a cooling chamber 3, a quenching chamber 4 with a water-spray device 5, an extraction housing 6 and a discharge shaft 7.

The pre-chamber 2 and an upper part 3a of the cooling chamber 3 each have an outlet 8, 9 tapered concentrically downwards. An outlet 10, 11, 12 tapered downwards in the form of a funnel is provided respectively on a lower part 3b of the cooling chamber 3, on the quenching chamber 4 and on the extraction housing 6.

The outlet 10 of the cooling chamber 3 projects into the quenching chamber 4, and the outlet 11 of the quenching chamber 4 projects into the extraction housing 6.

In the upper part 3a and in the lower part 3b of the cooling chamber 3, in the quenching chamber 4 and in the extraction housing 6 there are annular spaces 13, 14, 15, 16 free of the coke bed.

The pre-chamber 2 has an upper part 2a which is connected to the filling shaft 1 and which widens concentrically downwards. The upper part 2a merges into a cylindrical middle part 2b of the pre-chamber 2, which terminates in a lower part 2c tapered concentrically at the outlet 8. The middle part 2b and the lower part 2c of the pre-chamber 2 are surrounded by an outer cylindrical annular shell portion 17.

The upper part 3a of the cooling chamber 3 is surrounded over approximately ⅔ in an axial direction by a cylindrical lower annular shell portion 18, which is the downward continuation of the annular shell portion 17. The lower annular shell portion 18 merges downwards into the lower part 3b, tapering in the form of a funnel, of the cooling chamber 3.

From the cooling chamber 3 a cooling-gas discharge line 19 leads via a course separator 20, a heat sink 21, a cyclone separator 22, a blower 23 and a throttling device 24 and passes as a cooling-gas delivery line 25 through the upper region of the lower annular shell portion 18 into the cooling chamber 3 again.

From the cooling-gas delivery line 25 an extraction line 25 branches off via a throttling device 27 and a packed spray cooler 28 to a take-off point 29.

A water delivery line 30 leads to the packed spray cooler 28 via a throttling device 31. The packed spray cooler 28 has a condensate vessel 32 which is connected via a connecting line 33 to the water-spray device 5 in the quenching chamber 4.

A take-off line 34 leads from the extraction housing 6 via a cyclone separator 35, a blower 36 and a throttling device 37 to an exhaust steam pipe 38. Between the blower 36 and the throttling device 37, a return line 39, which opens into the quenching chamber 4 via a throttling device 40, branches off from the take-off line 34.

The process according to the invention takes place as follows:

As in known dry cooling with inert gas, the coke is introduced, with the exclusion of air, into the apparatus batchwise from above through the filling shaft 1 and is removed continuously at the bottom through the discharge shaft 7. On its way through the prechamber 2, the cooling chamber 3 and the quenching chamber 4, the coke is cooled from approximately 1,100° C. when it enters to approximately 100° C. when it leaves. As an intermediate store with a batchwise increase and gradual lowering of the filling level, the pre-chamber 2 allows stationary operation of the cooling chamber 3. In this, a cooling gas consisting essentially of water gas ($CO + H_2$) and water vapor is conveyed in counterflow through the coke bed and, during this time, is heated from approximately 150° C. at the end of the cooling-gas feed line 25 to approximately 600° to 850° C. at the start of the cooling-gas discharge line 19. The last-mentioned temperature of 600° C. of the cooling gas applies to the maximum possible generation of water gas in the upper hot zone of the cooling chamber 3. The water gas arises here, according to the endothermic reaction $C+H_2O \rightarrow CO+H_2$, from the water vapor ($H_2O$) in the cooling gas and the carbon (C) in the coke. As a result of this reaction, part of the heat to be recovered is extracted from the coke, so that its temperature drops. The dimensions and operational data of the apparatus are coordinated with one another so that the coke is cooled to below 400° C. when it enters the quenching chamber 4.

The hot cooling gas flowing off into the cooling-gas discharge line 19 from the upper annular shell portion 17 is cleared in the course separator 20 of part of the coke dust carried with it and is then cooled to approximately 150° C. in the heat sink 21, for example a waste-heat boiler for generating higher-pressure secondary steam as the working fluid of a steam-power process. The cooling gas further cleaned in the cyclone separator 22 and then compressed in the blower 23 branches, after the throttling device 24, into an extraction stream conveyed via the extraction line 26, the throttling device 27 and the packed spray cooler 28 to the take-off point 29 for external utilization of the de-humidified gas and into a return stream via the cooling-gas delivery line 25 to the cooling chamber 3. In the steady state, the proportion by mass of water gas in the extraction stream corresponds to the generation of water gas in the coke bed. To compensate for the water vapor conveyed away by means of the extraction stream and the water vapor consumed during the generation of water gas, an equivalent quantity of water is fed as cooling water to the packed spray cooler 28 via the water delivery line 30 and the throttling device 31. This cooling water combines in the spray cooler 28 with the condensate formed there and is collected together with this in the condensate vessel 32. From there, the water is fed via the connecting line 33 into the water-spray device 5 in the quenching chamber 4. In comparison with other coolers, the packed spray cooler 28 has the advantage that it separates from the extraction stream of cooling gas the dust contained therein.

The water sprayed in the quenching chamber 4 evaporates within the coke bed which is still sufficiently hot there. In this case, the quantity of vapor generated corresponds to the sum of the part quantities of vapor which are conveyed, on the one hand, upwards through the funnel-shaped outlet 10 of the cooling chamber 3 into this chamber and, on the other hand, downwards through the funnel-shaped outlet 11 of the quenching chamber 4 into the annular space 16 of the extraction housing 6, the take-off line 34, the cyclone separator 35, the blower 36 and the exhaust steam pipe 38 into the environment. The vapor generation in the quenching chamber 4 has superimposed on it a vapor circulation stream through the coke bed downwards via the extraction housing 6, the take-off line 34, the cyclone separator 35, the blower 36 and the return line 39 to the quenching chamber 4. This circulation stream permits, in conjunction with the setting of the throttling device 37 in the exhaust steam pipe 38 and of the throttling device 40 in the return line 39, equalization of the vapor pressure in the discharge shaft 7 to the ambient pressure and regulation of the vapor stream conveyed into the cooling chamber 3 through its outlet 10. This last-mentioned vapor stream can be adjusted between the value 0, at which the total quantity of vapor generated in the quenching chamber is diverted through the exhaust steam pipe 38, and a maximum value corresponding to this quantity of vapor when the exhaust steam pipe 38 is closed. The particular setting is defined by the excess pressure of the returned vapor in the quenching chamber 4 in relation to the gas pressure when the cooling gas enters the cooling chamber 3 from the cooling-gas delivery line 25, this gas pressure itself being determined by the pressure drop of the cooling gas in the cooling chamber 3 and by the gas pressure in the pre-chamber 2 coinciding with the ambient pressure. With the vapor steam diverted into the cooling chamber 3 from the quenching chamber 4, changes take place in the generation of water gas, in the composition of the cooling gas and in the cooling-gas stream which is conveyed away via the extraction line 26 and which is regulated by the throttling device 27 in such a way that the required pressure equalization with the environment is established in the pre-chamber 2.

A limitation of the cooling-gas stream conveyed via the extraction line 26 and therefore also of the above-mentioned vapor stream from the quenching chamber 4 into the cooling chamber 3 arises from the requirement that, with the exception of the quenching water sprayed in the quenching chamber 4 via the water-spray device 5, no additional cooling water is to be used for cooling and de-humidifying the extracted cooling gas in the packed spray cooler 28. For cooling the coke in the quenching chamber 4 from approximately 350° C. in the outlet 10 of the cooling chamber 3 to approximately 100° C. in the discharge shaft 7, a quantity of quenching water of approximately 13% of the quantity of coke is required in the case of complete evaporation. In this way, a quantity of water vapor from the cooling gas of approximately 1.5% of the quantity of coke can condense in the spray cooler 28. For this extreme case, it follows from the mass-flow balances, in the case of an assumed rate of gasification of the coke of 3%, that the vapor stream diverted into the cooling chamber 3 is 6%, the vapor stream conveyed away to the outside is 7%, the cooling-gas extraction stream is 9%, the generation of water gas is 7.5% of the quantity of coke and the proportion by mass of water gas in the cooling-gas return stream is approximately 83%. At this high concentration of water gas, the abovementioned favorable heat transmission properties of the cooling gas, which are attributable to the hydrogen, are obtained.

If appropriate, the wall of the pre-chamber 2 can be designed partially or completely in a conventional way so that it can absorb heat from the coke bed in the pre-chamber 2 and can divert this for further utilization within this enclosure or transfer it to the cooling gas flowing to the cooling-gas discharge line 19.

Details of the process indicated and of the apparatus described can also be modified in a way familiar to a person skilled in the art. For example, different embodiments of the heat sink, the cleaning devices for the cooling gas and water vapor, the blowers, the throttling devices and the cooler for the extracted cooling gas are possible. Also, additional conveying devices for liquid or gaseous media can be provided.

What is claimed is:

1. A process for utilizing waste heat and for obtaining water gas during the cooling of incandescent coke ejected from a chamber oven, this process comprising two stages, in which (a) in a first stage, dry-cooling is effected with a cooling gas, wherein the cooling gas enters the lower region of a cooling zone, rises by counterflow through the coke falling in the cooling zone, thereby absorbing heat, flows out from the cooling zone in the upper region thereof, is recooled in a heat sink and is then cleaned, and is recirculated into the lower region of the cooling zone, and (b) in a second stage, at a lower coke temperature relative to the first stage, the coke is wet-cooled with water sprayed in a quenching zone, whereupon the cooled coke is discharged via a discharge zone, including, in the first stage according to (a), forming a mixture of water gas and water vapor which is used as the cooling gas, and wherein, in the second stage according to (b), the water vapor formed during evaporation of the water sprayed into the quenching zone is conveyed through the coke, portion of said water vapor being drawn off from there, discharged into the environment after cleaning and/or fed back into the quenching zone and wherein a portion of said water vapor is conveyed through the coke into the cooling zone located above the quenching zone and reacts with the coke to form said mixture of water gas and water vapor.

2. A process as claimed in claim 1, wherein there is discharged via an extraction line, from the cooling gas cooled in the heat sink, for external utilization a quantity of said cooling gas which corresponds to the quantity of water vapor conveyed from the quenching zone into the cooling zone and to the quantity of water gas formed in the cooling zone.

3. A process as claimed in claim 2, wherein the discharged quantity of cooling gas is regulated so that the gas pressure in a feed zone located in front of the cooling zone in the flow path of the coke corresponds to ambient pressure.

4. A process as claimed in claim 3, wherein the water vapor contained in the discharged cooling gas is condensed and the condensate, together with cooling water used for condensation, is subsequently sprayed into the quenching zone.

5. A process as claimed in claim 4, wherein the quantity of water sprayed into the quenching zone is regulated as a function of the temperature of the coke in the discharge zone.

6. A process as claimed in claim 4, wherein a quantity of water is fed into the quenching zone such that the discharged coke contains excess water.

7. A process as claimed in claim 1, wherein part of said water vapor is discharged into the environment and part of the water vapor is returned to the quenching zone and wherein said parts are regulated so that a selected pressure difference is maintained between the vapor in the quenching zone and the cooling gas in the cooling zone whereby the pressure at the lower end of the discharge zone corresponds to ambient pressure.

* * * * *